United States Patent [19]
Sich et al.

[11] Patent Number: 6,132,009
[45] Date of Patent: Oct. 17, 2000

[54] REMOTE BRAKE APPLICATION VALVE

[75] Inventors: Gary M. Sich, Irwin; Michael McNeil, White Oak, both of Pa.

[73] Assignee: Westinghouse Air Brake Company, Wilmerding, Pa.

[21] Appl. No.: 09/121,445

[22] Filed: Jul. 23, 1998

[51] Int. Cl.[7] ................................................ B60T 13/74
[52] U.S. Cl. ................................ 303/3; 303/15; 303/20; 303/40
[58] Field of Search .............................. 303/119.1, 3, 15, 303/20, 40, 41, 33, 38, 37, 82, 16, 39, 86; 137/605, 607, 628, 624.11

[56] References Cited

U.S. PATENT DOCUMENTS

| | | | |
|---|---|---|---|
| 2,765,811 | 10/1956 | McClure | 137/788 |
| 2,785,933 | 3/1957 | McClure et al. | 303/39 |
| 2,905,199 | 9/1959 | Cook | 137/782 |
| 4,334,711 | 6/1982 | Mazur et al. | 303/16 |
| 4,776,648 | 10/1988 | Newton et al. | 303/40 |
| 5,326,159 | 7/1994 | Hart et al. | 303/33 |
| 5,564,794 | 10/1996 | Hart | 303/3 |
| 5,918,634 | 7/1999 | Hart | 303/3 |

*Primary Examiner*—Robert J. Oberleitner
*Assistant Examiner*—Mariano Sy
*Attorney, Agent, or Firm*—James Ray & Associates

[57] ABSTRACT

The present invention is a valve system for exhausting air from a brakepipe in a remote portion of a train. It has a pressure containment structure having a cylindrical bore and a piston mounted in the bore. A first valve chamber is on one side of the piston and a second valve chamber on a second side. A diaphragm seals between piston and bore, the diaphragm having an annular fold for permitting movement of the piston within the bore. The system has a first brakepipe pressure passageway for conveying air from the brakepipe to the first valve chamber and a control pressure connection for conveying air from a control chamber to the second valve chamber. A biasing means is provided for urging the piston toward the first valve chamber. A brakepipe exhaust valve connected to the piston is closed when the piston is moved toward the first valve chamber and opened when the piston is moved toward the second valve chamber so that when the pressure in the control chamber is reduced the brakepipe exhaust valve is opened and air is vented from the brakepipe. An annular sleeve is attached to the pressure containment structure and protrudes into the fold of the diaphragm to prevent the diaphragm from inverting if the pressure in the brakepipe drops below the pressure in the control chamber when the piston is positioned toward the first valve chamber.

19 Claims, 4 Drawing Sheets

6,132,009

REMOTE BRAKE APPLICATION VALVE

FIELD OF THE INVENTION

The present invention relates, in general, to remote brakepipe exhaust valves and, more particularly, the instant invention relates to a remote valve for emergency and service exhaust of brakepipe air in a railway vehicle.

BACKGROUND OF THE INVENTION

In the conventional railroad braking system, which is derived from the Westinghouse airbrake, brakes are controlled by air pressure in a brake air line, brakepipe, which is connected between individual railway vehicles in a consist of coupled railway vehicles. Pressure in the brake air line is generally controlled by a lead locomotive of the consist. Fail-safe operation is provided by designing the system so that the brake air line is pressurized to release the brakes, and depressurized to apply brakes. Emergency braking is provided by rapidly venting air from the brakepipe. If the brake air line fails so that its pressure drops, brakes are automatically applied.

Some time is required for a pressure decrement, initiated by the lead locomotive, to propagate down the line of railway vehicles. A pressure decrement for a service brake application requires about one minute to propagate down the length of a mile-long freight train. A pressure decrement for an emergency brake application requires about one half of a minute for a mile-long train.

In order to provide more rapid application of brakes, for either service or emergency application, an exhaust valve may be provided in a portion of the train. It may be in a remote locomotive of the train or in an end-of-train unit. The remote unit or end of train unit is usually controlled by radio signals from the locomotive, or it may be controlled by electrical trainlines which are connected between the individual railway vehicles of the train. The trainlines carry electrical signals from the lead locomotive to the remote unit.

The exhaust valve has a control reservoir which, during normal operation, contains air which is at the pressure of the brake air line. A prior art valve has a piston in a cylinder and has a diaphragm to prevent leakage between the piston and the cylinder. The piston has air on one side which is at the pressure of the brakepipe, and air on a second side which is at the pressure of the control reservoir. The piston is connected to a brakepipe exhaust valve which is closed when air on each side of the piston is at the same pressure.

When the remote unit or end of train unit receives a signal from the lead locomotive to exhaust air from the brake air line, it vents air from the control reservoir. This causes the piston to move and the brakepipe exhaust valve is opened.

The diaphragm has an annular fold which is directed toward the second side of the piston to permit the piston to move, while sealing between the piston and the cylinder. In normal operation of the exhaust valve, the air pressure on the first side of the piston is always equal to or greater than the air pressure on the second side of the piston, so the annular fold is able to withstand the pressure difference.

However, in a situation in which the brake air line fails so that its pressure drops, and no signal is received by the remote unit or end of train unit to reduce the pressure in the control chamber, then the pressure on the second side of the piston becomes greater than the pressure on the first side of the piston. In this case, the annular fold of the diaphragm may become jammed into the gap between the piston and the cylinder. The system must then be serviced before it can be used again.

SUMMARY OF THE INVENTION

The present invention is a valve system for exhausting air pressure from a brakepipe in a remote portion of a train. Such valve system includes pressure containment structure having a cylindrical outer bore formed therein and a piston mounted for axial movement in the cylindrical outer bore. A first valve chamber is disposed on a first side of the piston and a second valve chamber is disposed on a second side of the piston. A diaphragm provides a seal between the piston and the cylindrical outer bore, the diaphragm having an annular fold for permitting relative axial movement of the piston within the cylindrical outer bore. The annular fold is directed away from the first valve chamber and toward the second valve chamber.

The valve system has a first brakepipe pressure passageway for conveying air from the brakepipe to the first valve chamber and a control pressure connection for conveying air from a control chamber to the second valve chamber. A biasing means is provided in the second valve chamber for urging the piston to move toward the first valve chamber.

A stem is connected to the piston and to a brakepipe exhaust valve to be activated thereby. The brakepipe exhaust valve being closed when the piston is moved toward the first valve chamber and being opened when the piston is moved toward the second valve chamber.

An exhaust chamber, which is connected to atmosphere, is disposed on a first side of the brakepipe exhaust valve and a brakepipe pressure chamber is disposed on a second side of the brakepipe exhaust valve. The brakepipe pressure chamber having a fluid connection to the brakepipe so that when the control chamber is supplied with air at brakepipe pressure the brakepipe exhaust valve is closed and so that when a control pressure in the control chamber is reduced by venting to atmosphere the brakepipe exhaust valve is opened and brakepipe air is exhausted to atmosphere.

The pressure containment structure includes an annular sleeve protruding into the fold of the diaphragm to prevent the diaphragm from inverting if the pressure in the brakepipe drops below the pressure in the control chamber when the piston is positioned toward the first valve chamber.

OBJECTS OF THE INVENTION

It is, therefore, one of the primary objects of the present invention to provide a valve system for a remote unit or an end of train unit in a railway braking system which will not be harmed during a malfunction in which the pressure in the brakepipe falls without a signal being received by either the remote unit or the end of train unit to vent brakepipe air.

Another object of the present invention is to provide a valve system for a remote unit or an end of train unit in a railway braking system that is controlled by a pressure in a control chamber which has a piston disposed within a cylinder that is responsive to the control chamber pressure and which has a diaphragm to prevent leakage between the piston and cylinder in which the diaphragm cannot be harmed by a loss of pressure in the brake air line without a reduction in the control chamber pressure.

An additional object of the present invention is to provide a valve system for a remote unit or an end of train unit in a railway braking system which uses an annular guide sleeve to prevent inversion of a diaphragm between a piston and a cylinder in the valve system.

Yet another object of the present invention is to provide a valve system with means for protecting a diaphragm from inversion retained a housing of the prior art valve system and only requires a new housing cover having an annular guide sleeve which prevents diaphragm inversion.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing Figures and with the appended claims.

Figure 1:
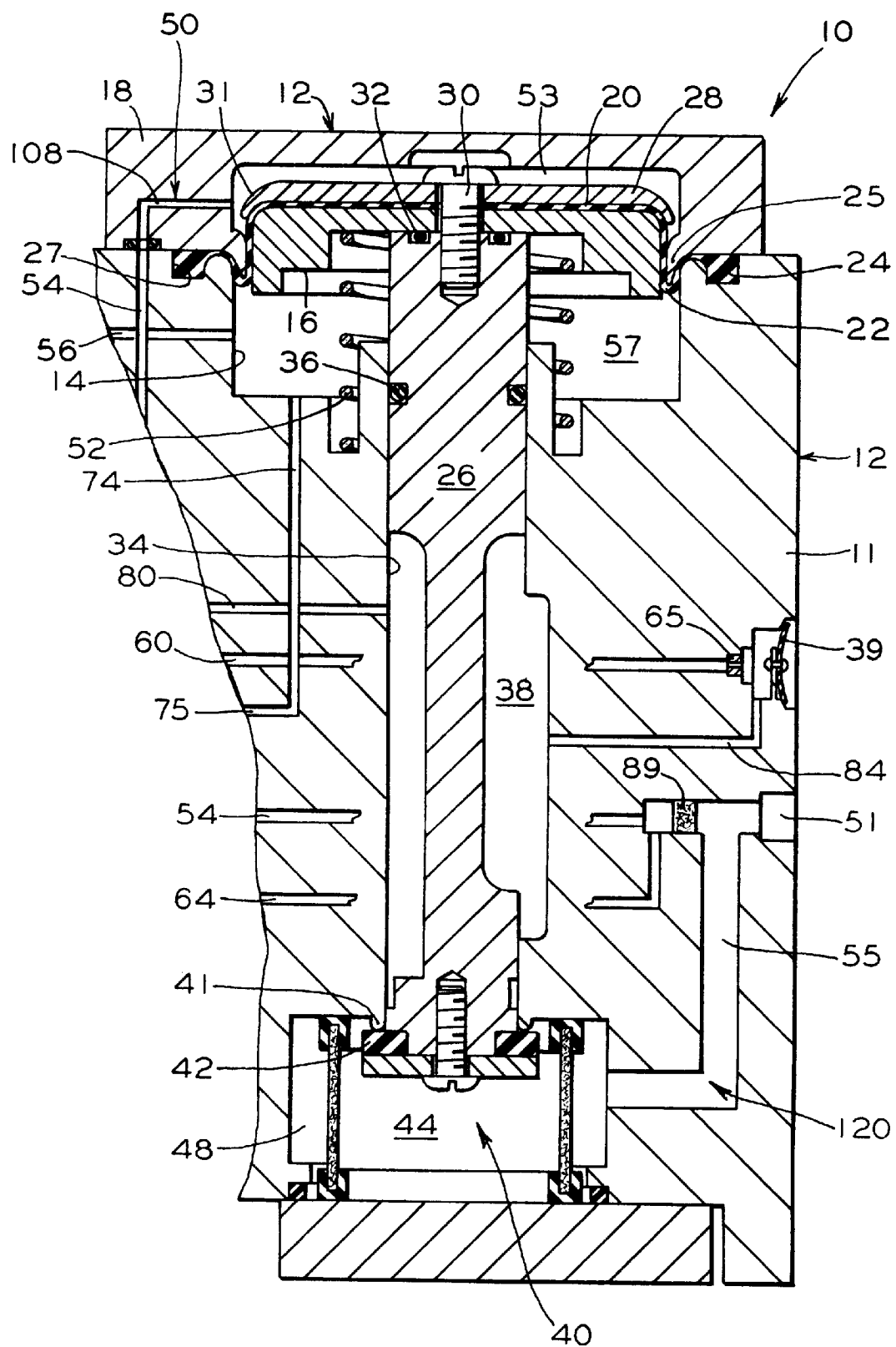
FIG. 1 is a schematic cross sectional view of a portion of a presently preferred embodiment of the invention which includes a piston and a brakepipe exhaust valve disposed within a pressure containment structure.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing Figures for the sake of clarity and understanding of the invention.

Reference is now made, more particularly, to FIGS. 1–5 of the drawings. Illustrated therein is a preferred embodiment of a valve system, generally designated 10, for the emergency or service release of air pressure from a brakepipe of a train. This valve system 10 is used in a railway vehicle which is remotely located from the lead locomotive. For example, such valve system 10 could be disposed in an end-of train unit, or in a slave locomotive.

Figure 2:
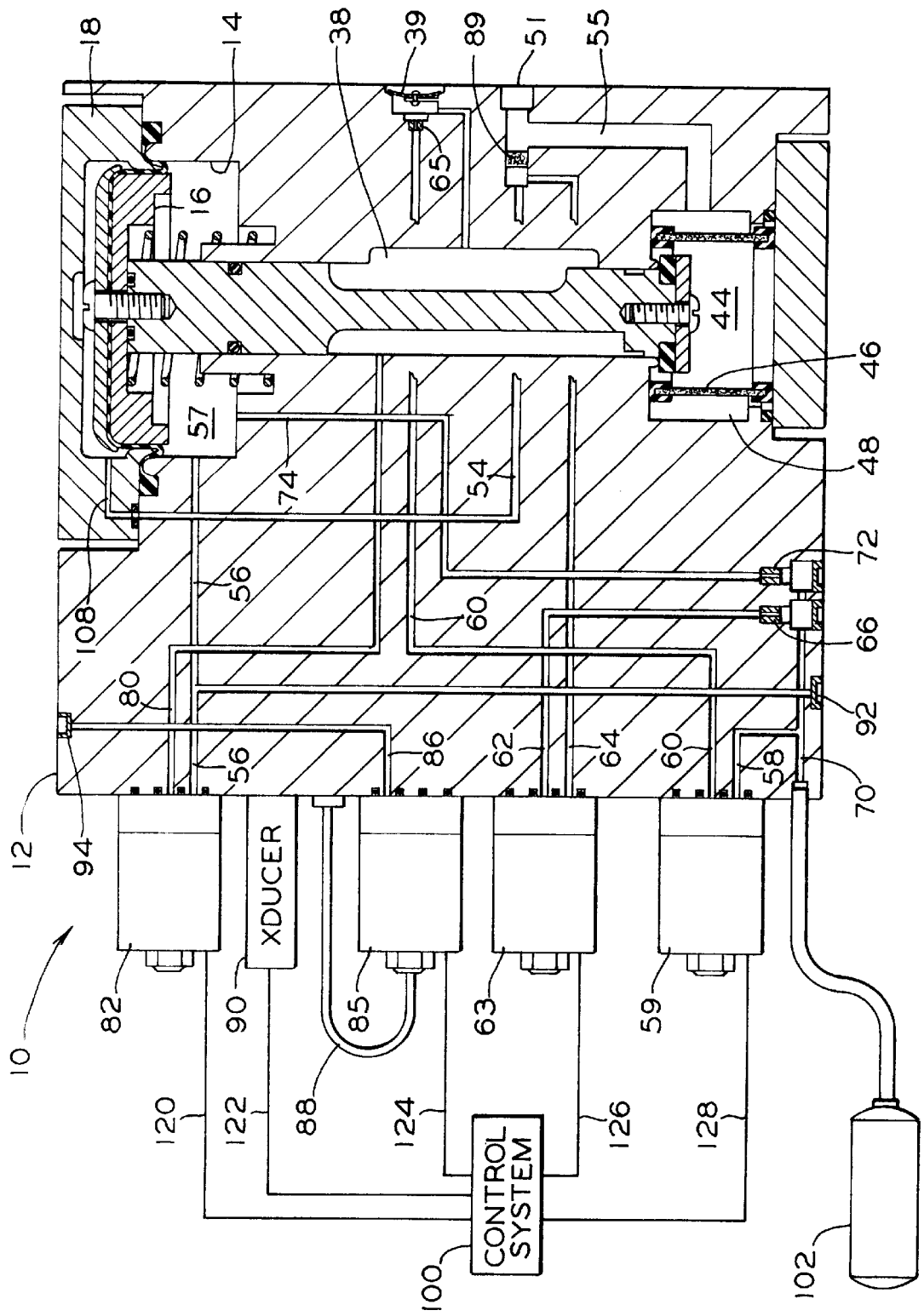
FIG. 2 is a schematic view partially in cross section of the presently preferred embodiment of the invention.

FIGS. 1 and 2 are cross-sectional schematic views which illustrate the major features of the invention. The valve system 10 has a pressure containment structure 12 having a cylindrical outer bore 14 formed therein. In the preferred embodiment, pressure containment structure 12 has a housing 11 and a cover 18. A piston 16 is mounted for axial movement within such cylindrical outer bore 14. There is a first valve chamber 53 disposed on a first side of piston 16 and a second valve chamber 57 disposed on a second side of such piston 16.

A diaphragm 20 provides a seal between the piston 16 and the cylindrical outer bore 14. The diaphragm 20 includes an annular fold 22 for permitting relative axial movement of the piston 16 within the cylindrical outer bore 14. The annular fold 22 is directed away from the first valve chamber 53 and toward the second valve chamber 57.

A first brakepipe pressure passageway, generally designated 50, is provided to convey brakepipe air to the first valve chamber 53. In the preferred embodiment shown, first brakepipe pressure passageway 50 includes a passageway 108 in the cover 18, a housing brakepipe pressure passageway 54, a filter plug 89 and a portion of outer brakepipe passageway 55. Such portion of the outer brakepipe passageway 55 terminates in a brakepipe pressure port 51. Brakepipe pressure port 51 is for connection to the brakepipe (not shown).

Figure 3:
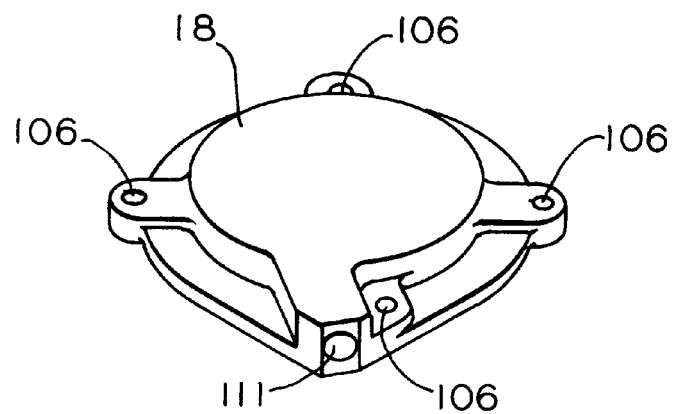
FIG. 3 is a perspective view of a housing cover utilized in the presently preferred embodiment of the invention.
Figure 4:
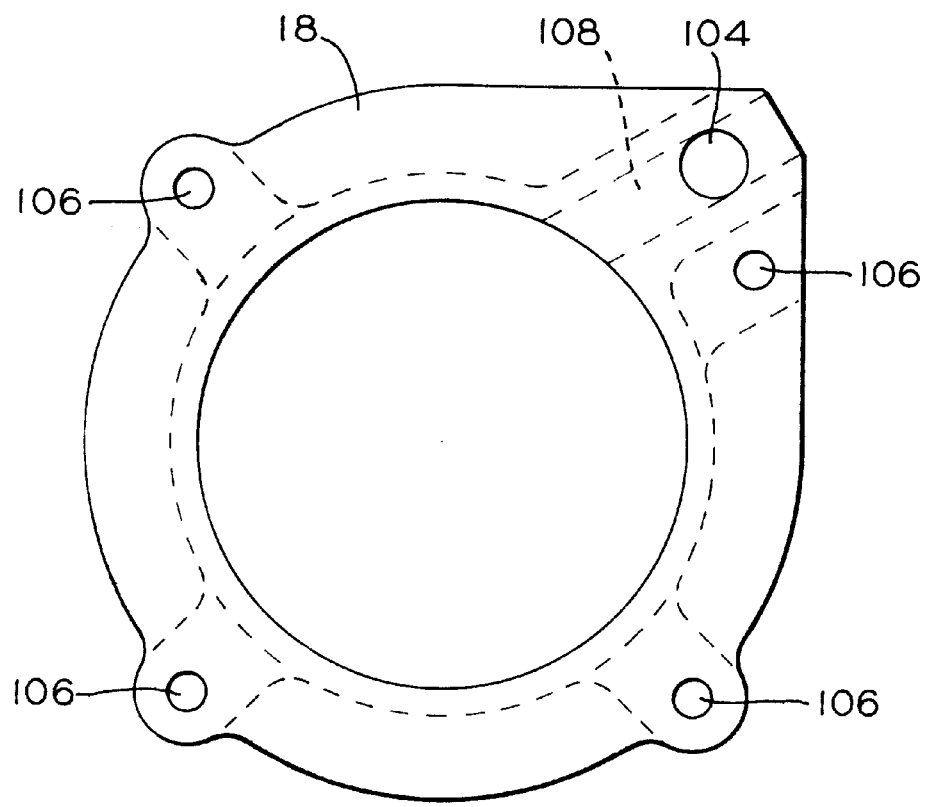
FIG. 4 is a plan view illustrating the mating surface of the housing cover illustrated in FIG. 3.

A presently preferred embodiment of the cover 18 is illustrated in FIGS. 3 and 4. As can be readily seen therein, the cover 18 includes a plurality of holes 106 that enable such cover 18 secured to the housing 11 by bolts or screws (not shown). A fluid communication passageway 108 is formed in the cover 18 which, after machining, may be closed at its outermost end by a plug 111. Passageway 108 connects to a port 104 which mates with the brakepipe pressure passage 54 formed in the housing 11.

A control pressure connection 75 is provided for conveying air from a control chamber 102 to the second valve chamber 57. In the presently preferred embodiment illustrated in the drawing Figures, the control pressure connection 75 includes a control pressure passageway 70, a control pressure choke 72 and a choked control pressure passageway 74.

There is a biasing means 52 provided for urging the piston 16 to move toward the first valve chamber 53. In the presently preferred embodiment of the invention, such biasing means 52 is a spring mounted in compression in the second valve chamber 57.

A stem 26 is connected to the piston 16 and a brakepipe exhaust valve, generally designated 40, having a moveable sealing portion 42 is connected to the stem 26. The moveable sealing portion 42 seats against a valve seat 41. The brakepipe exhaust valve 40 is closed when the piston 16 is moved toward the first valve chamber 53 and is opened when the piston 16 is moved toward the second valve chamber 57.

An exhaust chamber 38, connected to atmosphere, is disposed on a first side of the brakepipe exhaust valve 40. Preferably, this connection to atmosphere is through a passageway 84 to a flapper valve 39.

There is also a brakepipe pressure chamber 44 located on a second side of the brakepipe exhaust valve 40. The brakepipe pressure chamber 44 is connected by second brakepipe pressure passageway 120 to the brakepipe pressure connection so that when the brakepipe exhaust valve 40 is opened, the brakepipe (not shown) is vented to the exhaust chamber 38. In the presently preferred embodiment, second brakepipe pressure passageway 120 includes a filter 46, an outer brakepipe pressure chamber 48, and outer brakepipe passageway 55. Brakepipe pressure port 51 is for connection to the brakepipe.

When the control chamber 102 is supplied with air, at brakepipe pressure, the brakepipe exhaust valve 40 is closed and when a control pressure in the control chamber 102 is reduced by venting to atmosphere the brakepipe exhaust valve 40 is opened and brakepipe air is exhausted to atmosphere through the second brakepipe pressure passageway 120.

An annular sleeve 25 is attached to the pressure containment structure 12. The annular sleeve 25 protrudes into the fold 22 of the diaphragm 20 to prevent the diaphragm 20 from inverting if the pressure in the brakepipe drops below the pressure in the control chamber 102, at a time when the piston 16 is positioned toward the first valve chamber 53. The situation in which the brakepipe pressure drops below the pressure in the control chamber 102 may occur if the brakepipe of the train fails, so that its pressure drops, and no signal is received by the remote unit or end of train unit to reduce the pressure in the control chamber 102. The purpose of the present invention is to prevent damage to the diaphragm 20 in that case. Preferably, the annular sleeve 25 is a portion of the cover 18.

It should be noted that in each of the schematic drawing FIGS. 1 and 2, passageways which are aligned on opposite sides of exhaust chamber 38 are connected to each other.

Control pressure connection 75, preferably, is formed in the housing 11. It, preferably, consists of the control pressure passageway 70, choke 72 and choked control pressure passageway 74.

It is presently preferred that the diaphragm 20 have a circumferential ridge 24 for fitting within a circular groove 27 which may be formed either in the cover 18 or, preferably, in the housing 11.

It is preferred that such diaphragm 20 be clamped between the cover 18 and the housing 11 to form a seal between such cover 18 and housing 11.

Figure 5:
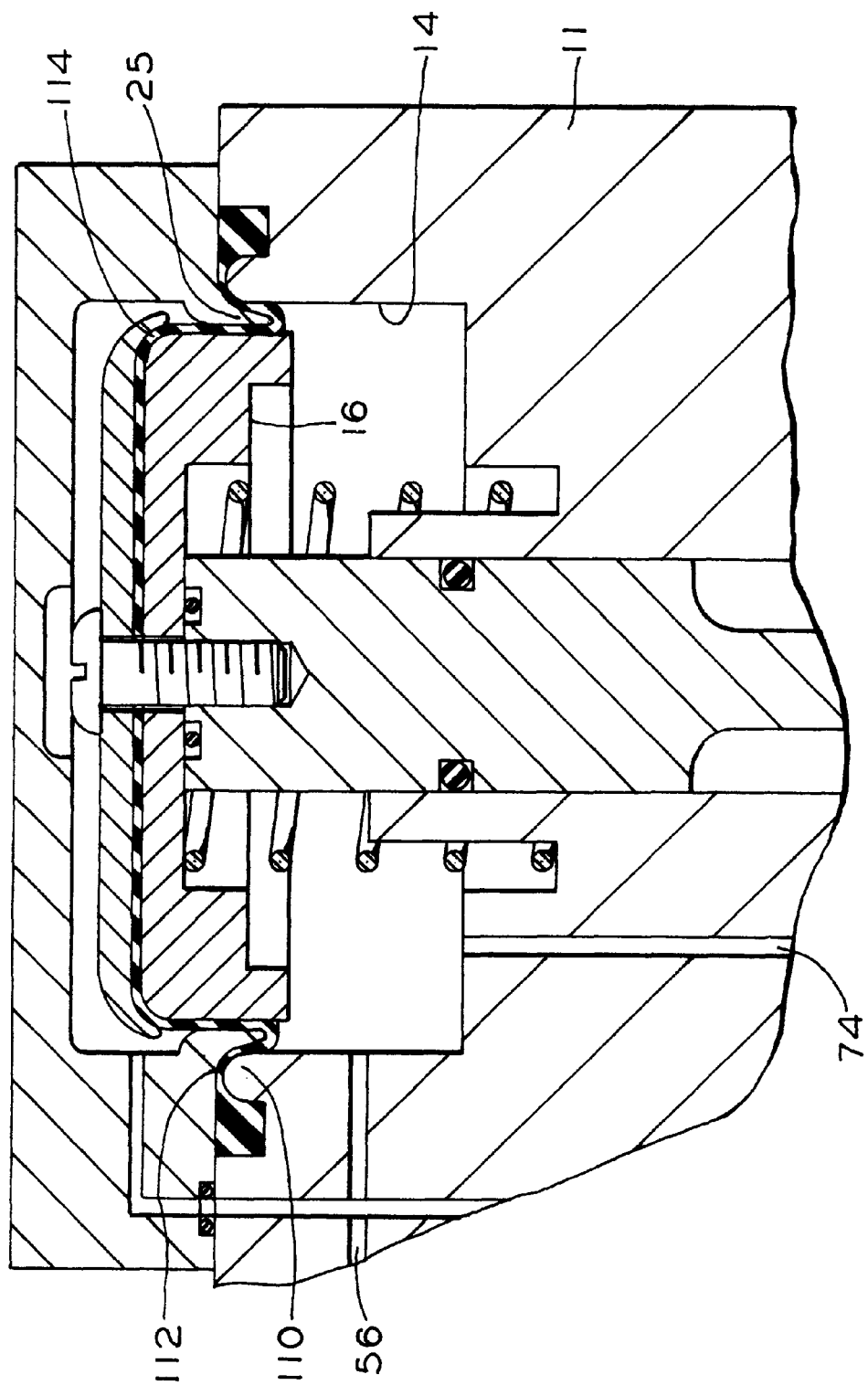
FIG. 5 is an enlarged cross sectional view which illustrates in greater detail the piston, piston cover and annular guide sleeve.

As illustrated in FIG. 5, the cylindrical outer bore 14, preferably, has a rounded circumferential outside corner 110 to guide the diaphragm 20 into annular fold 22. Likewise, the annular sleeve 25, preferably, includes a rounded circumferential inside corner 112 to guide such diaphragm 20 into annular fold 22.

Reference to FIG. 1 shows that the stem 26 is disposed within cylindrical bore 34 in housing 11 and is, preferably, sealed by an O-ring sealing member 36.

A diaphragm retainer plate 28 is provided to hold diaphragm 20 against the piston 16. Such piston 16, preferably, has a rounded circumferential outside corner 114 to guide the diaphragm 20 into annular fold 22. Likewise, the diaphragm retainer plate 28, preferably, has a curved rim portion 31 to guide such diaphragm 20 into annular fold 22. Diaphragm retainer plate 28 is, preferably, attached to the piston 16 by a threaded fastener 30. An O-ring sealing member 32 is provided to prevent loss of air around such threaded fastener 30.

As illustrated in FIG. 2, the valve system 10, preferably, includes an emergency solenoid valve 82 that is connected by a passageway 56 to the second valve chamber 57. Emergency solenoid valve 82 is also connected by a passageway 80 to the exhaust chamber 38. In this manner, the second valve chamber 57 can be vented through such emergency solenoid valve 82 to the exhaust chamber 38 so that the valve 40 can be opened for an emergency release of brakepipe air. Emergency solenoid valve 82 includes an electrical connection 120 to a control system 100 to be controlled thereby.

Also, as shown in FIG. 2, the valve system 10, preferably, includes a pressure transducer 90 having electrical connection 122 to a control system 100. The pressure transducer 90 measures the air pressure present in housing brakepipe pressure passageway 54.

Valve system 10, preferably, also includes a release solenoid valve 85 having an electrical connection 124 to control system 100. The release solenoid valve 85 is attached to passageway 88 which, in turn, is connected to passageway 56 which, in turn, is connected to the second valve chamber 57. Such release solenoid valve 85 is also connected to passageway 86 which is connected to passageway 54 and hence to the first valve chamber 53. When the release solenoid valve 85 is opened, the first valve chamber 53 has fluid connection to the second valve chamber 57 to equalize pressures in the first valve chamber 53 and the second valve chamber 57, so that spring 52 pushes piston 16 toward the first valve chamber 53 and exhaust valve 40 is closed. This feature is employed at the end of a service brake application.

Additionally, the valve system 10, preferably, includes a service supply solenoid valve 63 that is electrically connected by the electrical connection 126 to the control system 100. When it is energized, service supply solenoid valve 63 receives brakepipe air through passageway 64 from the filter plug 89 and supplies it through passageway 62 and a service supply choke 66 to control pressure passageway 70 and thence to control chamber 102.

Valve system 10 also preferably includes a service exhaust solenoid valve 59 having an electrical connection 128 to the control system 100. When it is opened, it receives air through passageway 58 from control pressure passageway 70 and hence from control chamber 102. It admits the air from passageway 58 to passageway 60 which is connected to flapper valve 39 through exhaust choke 65.

Housing 11 is a flowblock in which ports 94 and 92 are, preferably, included as test ports where pressure can be measured during maintenance.

While a presently preferred and various additional alternative embodiments of the instant invention have been described in detail above, in accordance the patent statutes, it should be recognized that various other modifications and adaptations of the invention may be made by those persons who are skilled in the relevant art without departing from either the spirit of the invention or the scope of the appended claims.

We claim:

1. A valve system for exhausting air from a brakepipe in a remote portion of a train, said valve system comprising:

(a) a pressure containment structure including a housing and a housing cover, said housing having a cylindrical outer bore formed therein;

(b) a piston mounted for axial motion in said cylindrical outer bore;

(c) a first valve chamber formed within said pressure containment structure, said first valve chamber being covered by said housing cover and being disposed on a first side of said piston;

(d) a second valve chamber formed within said housing portion of said pressure containment structure, said second valve chamber being disposed on a second side of said piston;

(e) a diaphragm connected to said piston and to said pressure containment structure, said diaphragm providing a seal between said piston and said cylindrical outer bore to provide a pressure boundary between said first valve chamber and said second valve chamber, said diaphragm having an annular fold for permitting relative axial movement of said piston within said cylindrical outer bore, said annular fold being directed away from said first valve chamber and toward said second valve chamber;

(f) a brakepipe pressure connection formed within said pressure containment structure, said brakepipe pressure connection for connection to such brakepipe;

(g) a first brakepipe pressure passageway formed within said pressure containment structure, said first brakepipe pressure passageway for conveying brakepipe pressure from said brakepipe pressure connection to said first valve chamber;

(h) a control pressure connection formed within said pressure containment structure for connection to a control chamber;

(i) a control pressure passageway formed within said pressure containment structure, said control pressure passageway joining said control pressure connection to said second valve chamber for conveying a control pressure in such control chamber to said second valve chamber;

(j) a biasing means connected to said piston and to said pressure containment structure for urging said piston to move toward said first valve chamber;

(k) a stem connected at a first end thereof to said piston;

(l) a brakepipe exhaust valve having a moveable portion connected to an axially opposed second end of said stem to be activated thereby, said brakepipe exhaust valve being closed when said piston is moved toward said first valve chamber and being opened when said piston is moved toward said second valve chamber;

(m) an exhaust chamber disposed within said pressure containment structure on a first side of said brakepipe exhaust valve, said exhaust chamber being connected to atmosphere;

(n) a brakepipe pressure chamber formed within said pressure containment structure on a second side of said brakepipe exhaust valve;

(o) a second brakepipe pressure passageway formed within said pressure containment structure, said second brakepipe pressure passageway connected to said brakepipe pressure connection and to said brakepipe pressure chamber so that when such control chamber is supplied with air at brakepipe pressure said brakepipe exhaust valve is closed and so that when a control pressure in such control chamber is reduced by venting to atmosphere said brakepipe exhaust valve is opened to exhaust brakepipe air from said brakepipe pressure connection through said second brakepipe passageway to said exhaust chamber and thence to atmosphere; and (p) an annular sleeve included as a portion of said housing cover, said annular sleeve protruding into said fold of said diaphragm to prevent said diaphragm from inverting if said brakepipe pressure drops below such pressure in such control chamber when said piston is positioned toward said first valve chamber.

2. A valve system, according to claim 1, wherein said first brakepipe pressure passageway includes a cover brakepipe pressure passageway portion formed in said housing cover and a housing brakepipe pressure passageway portion formed in said housing.

3. A valve system, according to claim 1, wherein said control pressure passageway is formed in said housing.

4. A valve system, according to claim 1, wherein said biasing means is a spring mounted in compression within said second valve chamber.

5. A valve system, according to claim 1, wherein said exhaust chamber is connected to atmosphere through a flapper valve.

6. A valve system, according to claim 1, wherein said diaphragm includes a circumferential ridge for fitting within a circular groove in at least one of said housing and said housing cover.

7. A valve system, according to claim 1, wherein said diaphragm is clamped between said housing cover and said housing and provides a seal between said housing cover and said housing.

8. A valve system, according to claim 1, wherein said cylindrical outer bore in said housing has a rounded circumferential outside corner to guide said diaphragm into said annular fold.

9. A valve system, according to claim 1 wherein said sleeve has a rounded circumferential inside corner to guide said diaphragm into said annular fold.

10. A valve system, according to claim 1, wherein said stem fits within a cylindrical inner bore formed in said housing, said stem being sealed against said cylindrical inner bore.

11. A valve system, according to claim 1, wherein said valve system further includes a piston cover plate for holding said diaphragm against said piston.

12. A valve system, according to claim 1, wherein said piston has a rounded circumferential outside corner to guide said diaphragm into said annular fold.

13. A valve system, according to claim 11, wherein said piston cover plate has a curved rim portion to guide said diaphragm into said annular fold.

14. A valve system, according to claim 11, wherein said piston cover plate is attached to said piston by an axial fastener.

15. A valve system, according to claim 1, wherein said valve system further includes an emergency solenoid valve electrically connected to a control system for said valve, said emergency solenoid valve being connected to exhaust air from said second valve chamber to cause said piston to move toward said second valve chamber and open said brakepipe exhaust valve to provide an emergency brakepipe exhaust.

16. A valve system according, to claim 1, wherein said valve system further includes a service exhaust solenoid valve electrically connected to a control system for said valve, said service exhaust solenoid valve being connected to such control chamber for exhausting air from such control chamber to lower such control pressure in such control chamber to make a controlled brakepipe pressure decrement.

17. A valve system, according to claim 1, wherein said valve system further includes a service supply solenoid valve electrically connected to a control system for said valve, said service supply solenoid valve being connected to admit air from such brakepipe to such control chamber.

18. A valve system, according to claim 1, wherein said valve system further includes a release solenoid valve having electrical connection to a control system for said valve, said release solenoid valve being connected to equalize a pressure in said first valve chamber with a pressure in said second valve chamber to close said brakepipe exhaust valve.

19. A valve system, according to claim 1, wherein said housing includes a flow block.

* * * * *